United States Patent [19]
Hoff

[11] Patent Number: 5,813,599
[45] Date of Patent: Sep. 29, 1998

[54] AUTOMATED CONTROLLER FOR NATURALLY VENTILATED LIVESTOCK AND POULTRY BUILDINGS

[75] Inventor: Steven J. Hoff, Ames, Iowa

[73] Assignee: Iowa State University Research Foundation, Inc., Ames, Iowa

[21] Appl. No.: 752,333

[22] Filed: Nov. 19, 1996

Related U.S. Application Data

[60] Provisional application No. 60/007,636 Nov. 28, 1995.

[51] Int. Cl.$^6$ ........................................................ F24F 11/00
[52] U.S. Cl. ............................ 236/49.3; 119/21; 454/239
[58] Field of Search .................................... 454/239, 256, 454/258, 364; 236/49.3; 119/21

[56] References Cited

U.S. PATENT DOCUMENTS

| | | | |
|---|---|---|---|
| 3,802,479 | 4/1974 | Newell, III et al. ........................ | 160/1 |
| 4,700,887 | 10/1987 | Timmons . | |
| 4,930,446 | 6/1990 | Huisinga .................................. | 119/21 |
| 5,147,244 | 9/1992 | Spilde .................................... | 454/364 |
| 5,482,210 | 1/1996 | Carey et al. ........................... | 236/49.3 |
| 5,492,082 | 2/1996 | Krevinghaus et al. ................... | 119/21 |

Primary Examiner—Harold Joyce
Attorney, Agent, or Firm—Zarley, McKee, Thomte, Voorhees & Sease

[57] ABSTRACT

A method of controlling ventilation and air quality within naturally ventilated livestock and poultry buildings comprises placing in a controller predetermined parameters of temperature and humidity for the building in question. Temperature and humidity sensors within the building are mounted above the floor with the temperature sensors being located directly above each of the animal or poultry pens. These sensors are connected to the controller to feed through the controller actual conditions of temperature and humidity within the building. The controller compares the actual conditions of temperature and humidity within the building with the predetermined parameters of temperature and humidity stored therein. The controller then increases or decreases the draft of air capable of passing through the ventilation openings to adjust the temperature and humidity within the building to fall within the predetermined parameters in those cases when the measured conditions of temperature and humidity are outside the predetermined parameters. The automated controller for naturally ventilated livestock and poultry buildings is in communication with an elongated livestock compartment which has a plurality of closeable air openings, preferably a ridge vent in the roof and closeable windows in the sides thereof. The controller has stored data therein involving predetermined parameters of temperature and humidity.

4 Claims, 6 Drawing Sheets

AUTOMATED CONTROLLER FOR NATURALLY VENTILATED LIVESTOCK AND POULTRY BUILDINGS

This application claims the benefit of U.S. Provisional application Ser. No. 60/007,636, filed Nov. 28, 1995.

BACKGROUND OF THE INVENTION

Confinement buildings for livestock and poultry are very common. These buildings are typically rectangular in shape and have a plurality of side window or roof openings that are used for ventilation purposes. The temperature and humidity conditions within the building must be given close attention because of varying weather conditions on the outside of the building, and because of the heat and dust conditions within the building generated by the animals or birds contained therein. Many such buildings have powered fans to assist in the air quality control within the buildings. Some buildings rely only on natural ventilation, and this invention pertains to buildings which are naturally ventilated.

Naturally ventilated buildings typically have side windows which are closeable by curtains or the like, along with a ridge-vent opening along the ridge of the sloped roof structure.

One of the principal shortcomings of existing naturally ventilated buildings is that outside weather conditions cause temperature and humidity conditions within the building to change, sometimes very rapidly, and the buildings are not able to quickly adjust to these changes. Temperature conditions are always a consideration throughout the year, and humidity conditions are a particular problem in colder seasons. In addition, it is difficult to ascertain different temperature conditions within a building and to accommodate for temperature variations within the same building.

It is therefore a principal object of this invention to provide a control logic and software to control automatically the ventilation openings in a naturally ventilated livestock or poultry building.

A further object of this invention is to provide an automated controller which can quickly adjust the ventilation openings to accommodate for changes in temperature and humidity within the building when those changes occur.

A still further object of this invention is to provide an automatic controller for naturally ventilated livestock and poultry buildings which can accommodate variations of temperature in different parts of a given building.

SUMMARY OF THE INVENTION

This invention entails a method of controlling ventilation and air quality within naturally ventilated livestock and poultry buildings wherein predetermined parameters of temperature and humidity within the building are stored in the controller. Temperature and humidity sensors within the building are mounted above the floor with the temperature sensors being located directly above each of the animal or poultry pens. These sensors are connected to the controller to feed through the controller actual conditions of temperature and humidity within the building. The controller compares the actual conditions of temperature and humidity within the building with the predetermined parameters of temperature and humidity stored therein. The controller then increases or decreases the draft of air capable of passing through the ventilation openings to adjust the temperature and humidity within the building to fall within the predetermined parameters in those cases when the measured conditions of temperature and humidity are outside the predetermined parameters.

The automated controller for naturally ventilated livestock and poultry buildings is in communication with an elongated livestock compartment which has a plurality of closeable air openings, preferably a ridge vent in the roof and closeable windows in the sides thereof. The controller has stored data therein involving predetermined parameters of temperature and humidity. Sensor means are located in the building and connected to the controller for measuring temperature and humidity within the building. The controller is adapted to compare the measured temperature and humidity conditions within the building to the parameters of temperature and humidity therefore stored therein, and the controller is then connected to the openings to increase or decrease the amount of air capable of moving through the openings to bring the conditions of temperature and humidity in the building within the predetermined parameters when the actual conditions of temperature and humidity as measured are outside those parameters.

DESCRIPTION OF THE PREFERRED EMBODIMENT

Figure 3:
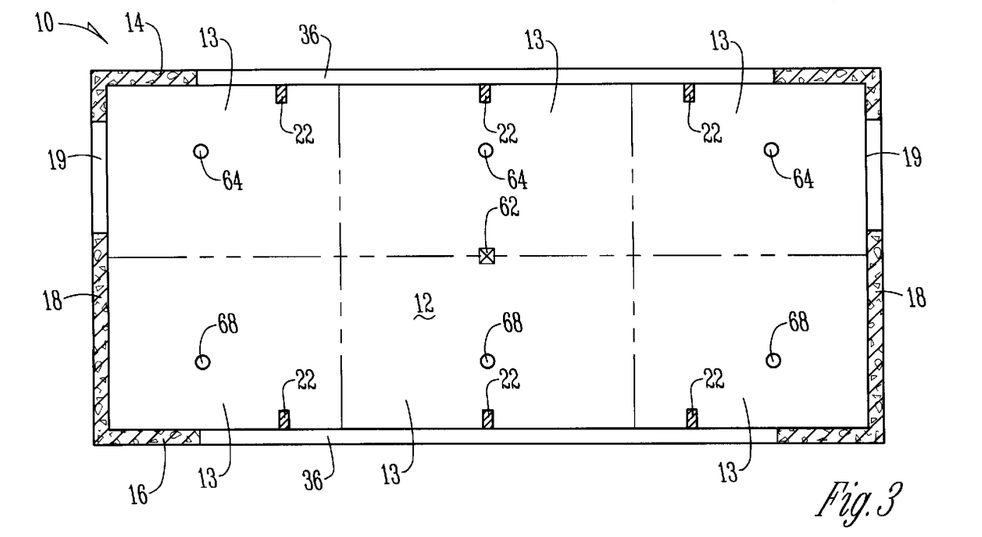
FIG. 3 is a horizontal sectional view of the building of FIGS. 1 and 2 showing the various sensors.

The drawings show schematically the structure of a naturally ventilated livestock and poultry building embodying this invention. The building 10 has a floor 12 that can be conventionally divided into a plurality of animal or poultry pens 13 (FIG. 3). The building 10 includes a "north" side wall 14 and a "south" side wall 16. The side walls are connected by end walls 18. Conventional door openings 19 can be utilized.

Figure 4:
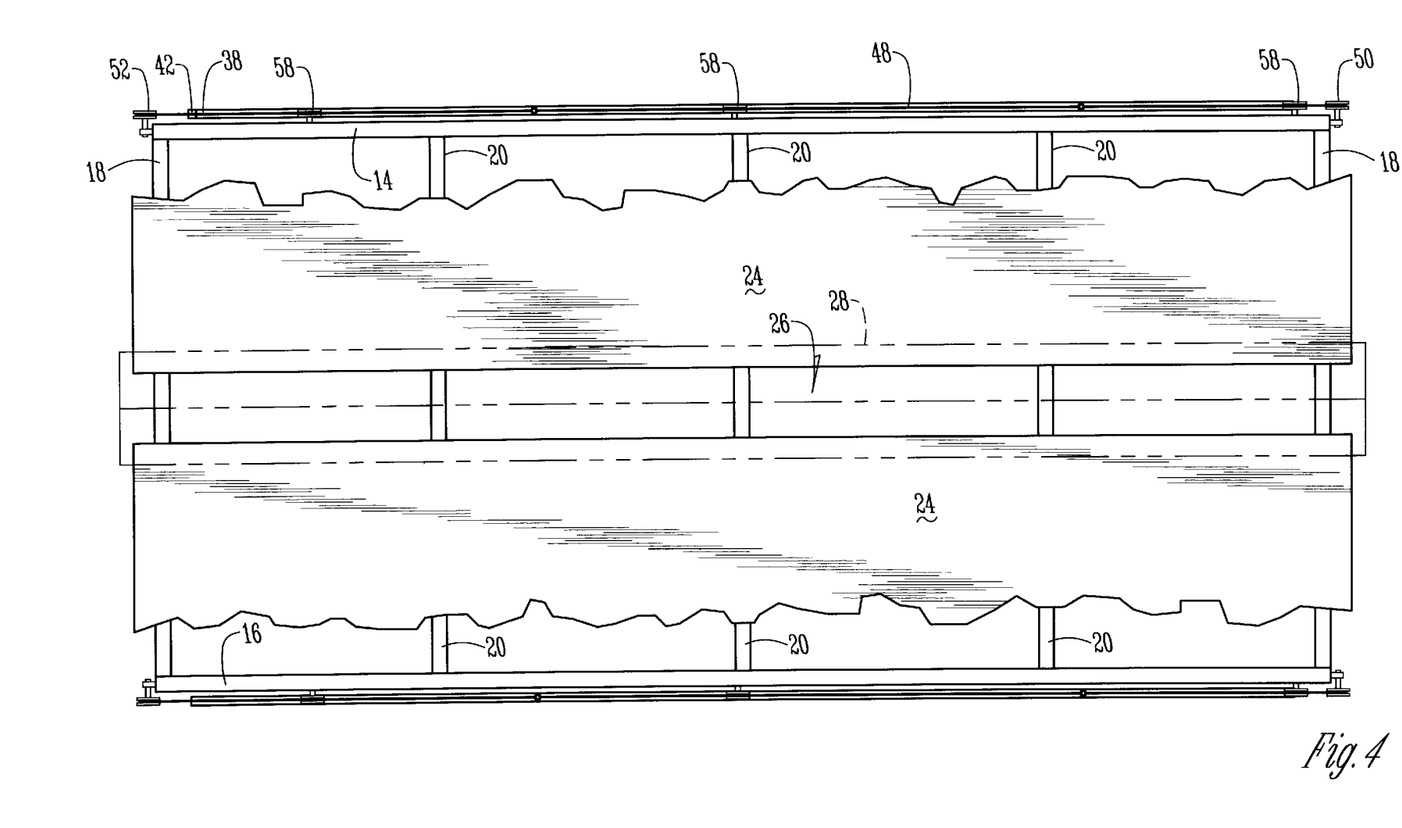
FIG. 4 is a large scale plan view of the building of FIG. 1 with portions of the roof broken away.
Figure 5:
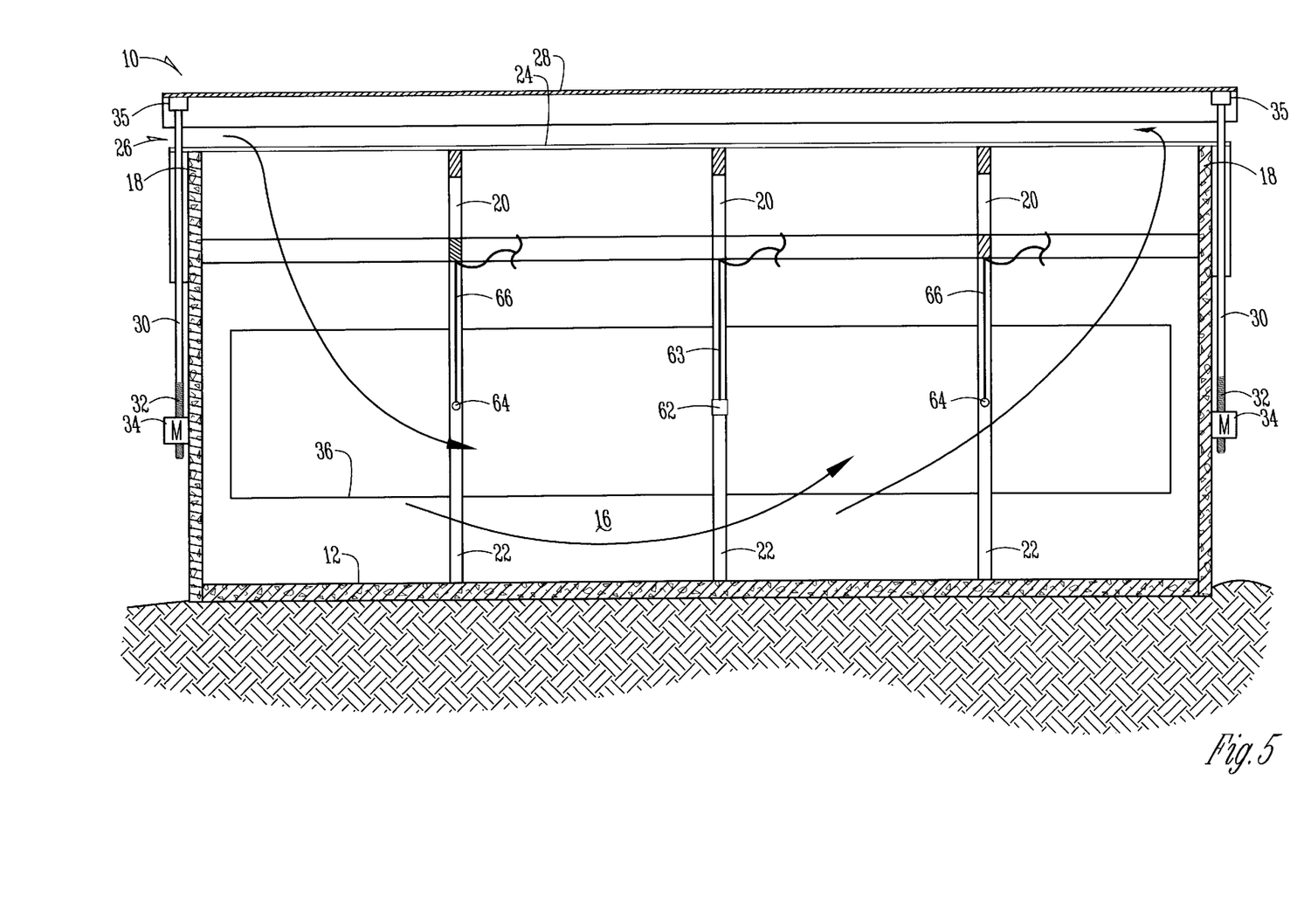
FIG. 5 is a longitudinal sectional view of the building of FIG. 1.
Figure 6:
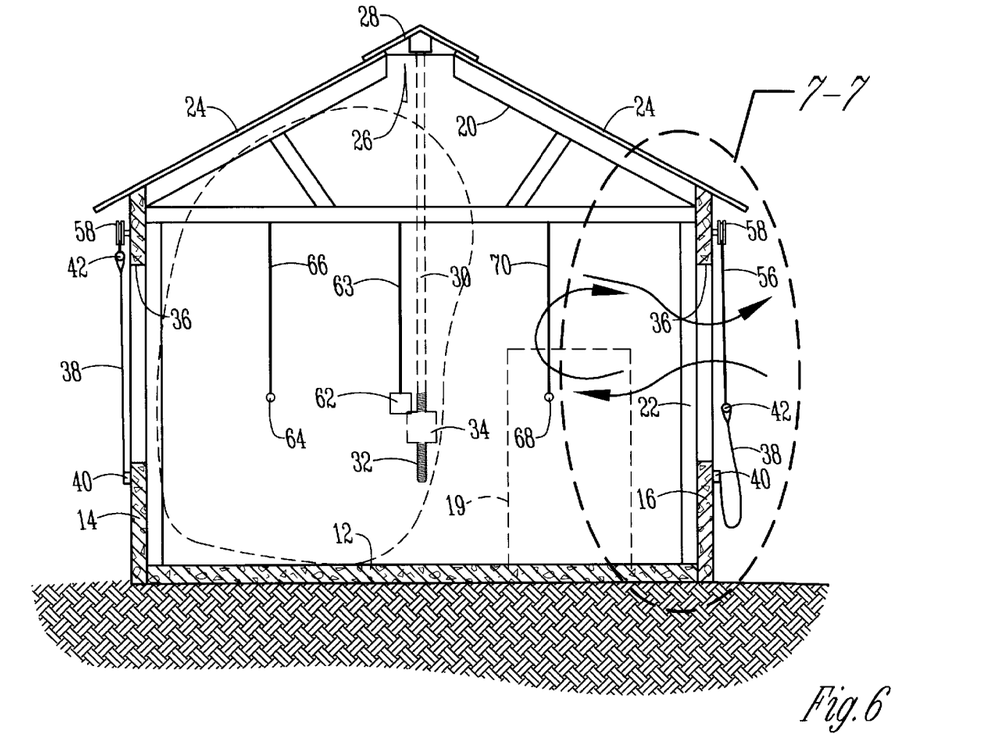
FIG. 6 is a transverse sectional view of the building of FIG. 2.

With reference to FIG. 6, conventional roof trusses 20 mounted on side walls 14 or 16, or on support posts 22 (FIG. 5) extend laterally across the building 10 to support separate roof sections 24 (FIG. 4). The roof sections 24 are separated by a ridge vent opening 26 which can be opened or closed by a roof vent closure 28. The roof vent closure can be moved vertically by any convenient means such as by vertical rods 30 secured to the ends of the roof enclosure 28 at the ends of building 10. Threads 32 (FIG. 2) on the lower ends of rods 30 are journaled in gear motor 34. The upper end of rod 30 is journaled in bearing 35 mounted on the underside of the roof vent closure 28.

Figure 1:
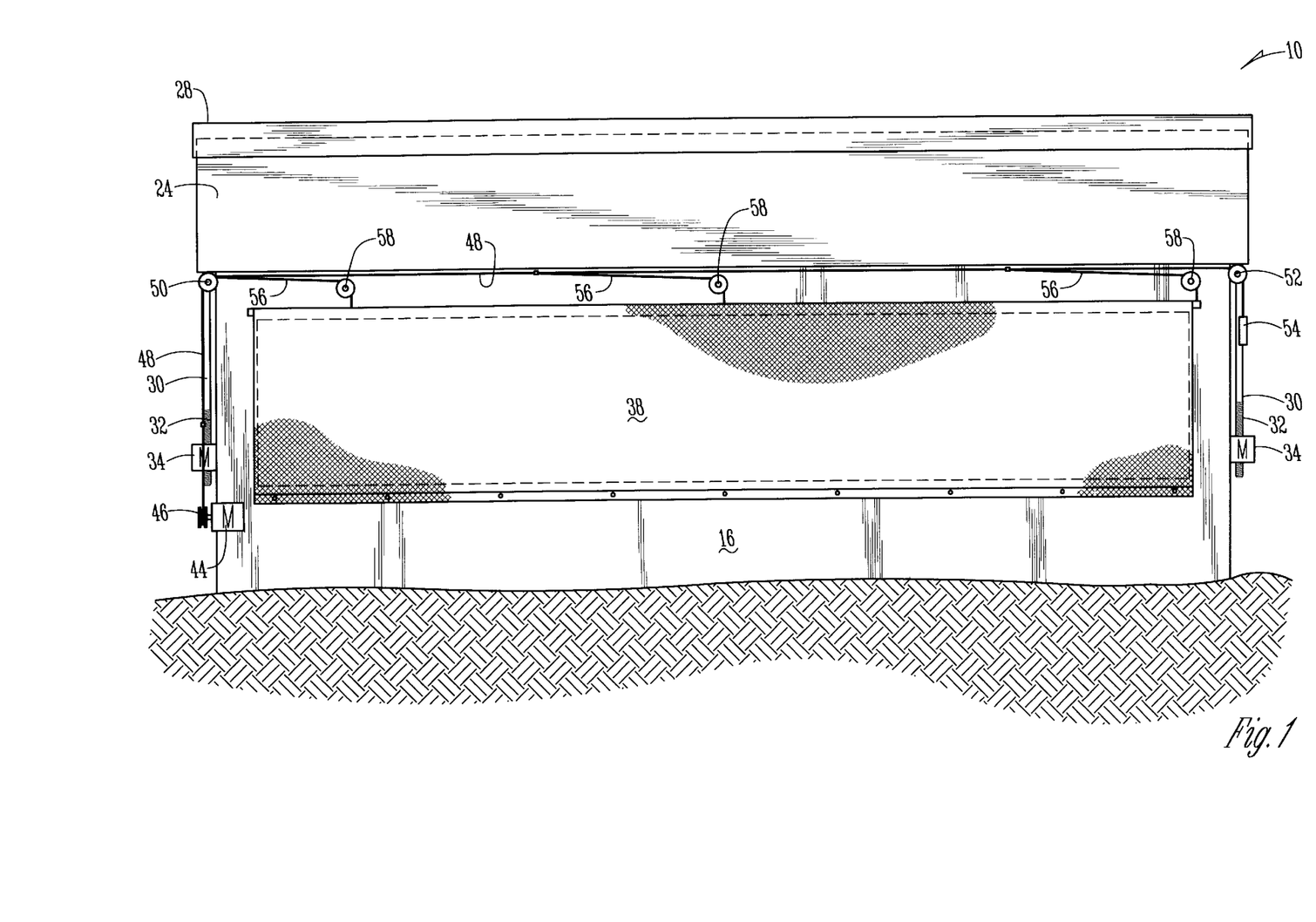
FIG. 1 is a typical side elevation of a livestock confinement building embodying this invention.
Figure 7:
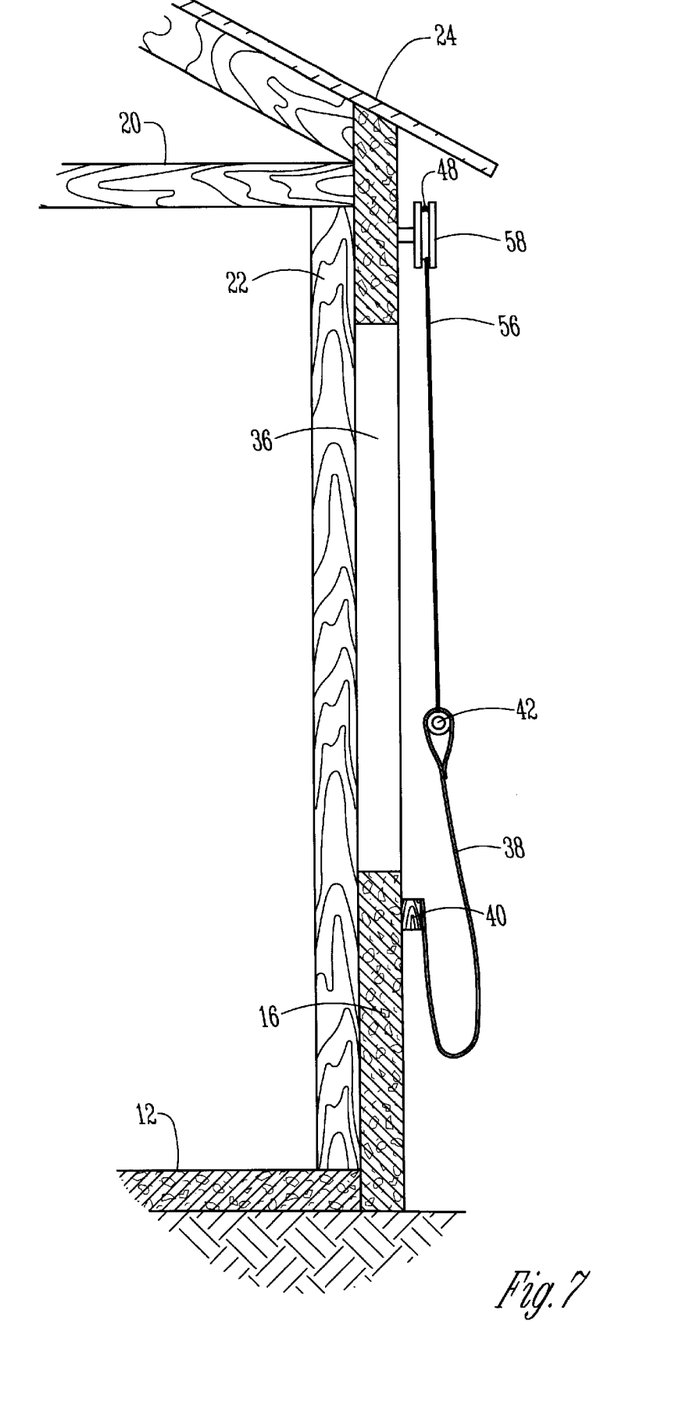
FIG. 7 is an enlarged scale sectional view of a side window detail taken on line 7—7 of FIG. 6.

Conventional elongated windows 36 are located in the side walls 14 and 16. A conventional window closure means is shown in FIG. 7, and includes an elongated flexible curtain 38 which has its lower horizontal edge rigidly secured to an elongated horizontal rail 40 on the outside of the side walls. The upper horizontal edge of the curtain 38 is supported by an elongated rod 42. As shown in FIG. 1, conventional winch motors 44 are mounted on the side walls of the building 10 and are operatively secured to a vertically disposed winch pulley 46. A cable 48 has an end secured to pulley 46 and extends upwardly around pulley 50 and thence horizontally along the building 10 above the windows 36 where it extends around and downwardly over pulley 52. A weight 54 is secured to the free end of cable 48 to always secure the cable 48 under conditions of tension. A plurality of short riser cables 56 are secured by one end in any convenient manner to the horizontal portion of cable 48. The free ends of riser cables 56 are threaded over pulleys 58 mounted on the sides of the building and then extend downwardly for attachment to rod 42. When the motor 44 is energized to rotate pulley 36 in one direction, the pulley 48 is wound up on pulley 46. This would be done when the curtain 38 was in the open condition of FIGS. 6 and 7. That action would cause the cable 48 as viewed in FIG. 1 to move to the left and would cause the riser cables 56 to move with the cable 48, thus causing the curtain 38 to move from its open condition in FIGS. 6 and 7 to the closed position shown in FIGS. 1 and 2.

Figure 2:
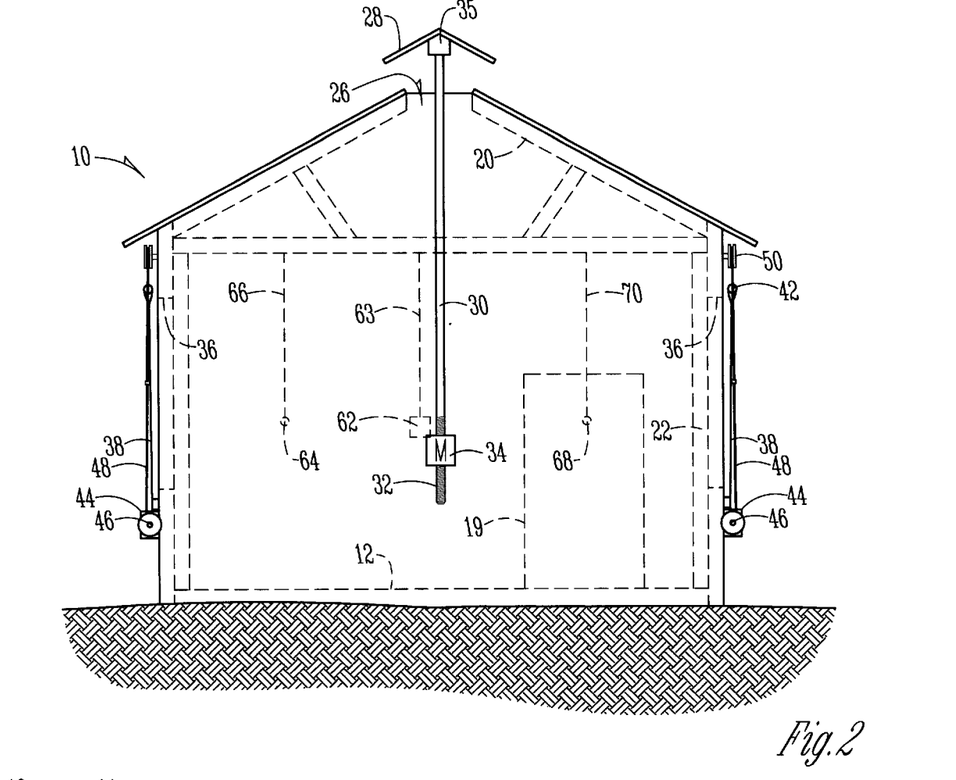
FIG. 2 is a typical end elevation of the building of FIG. 1.
Figure 8:
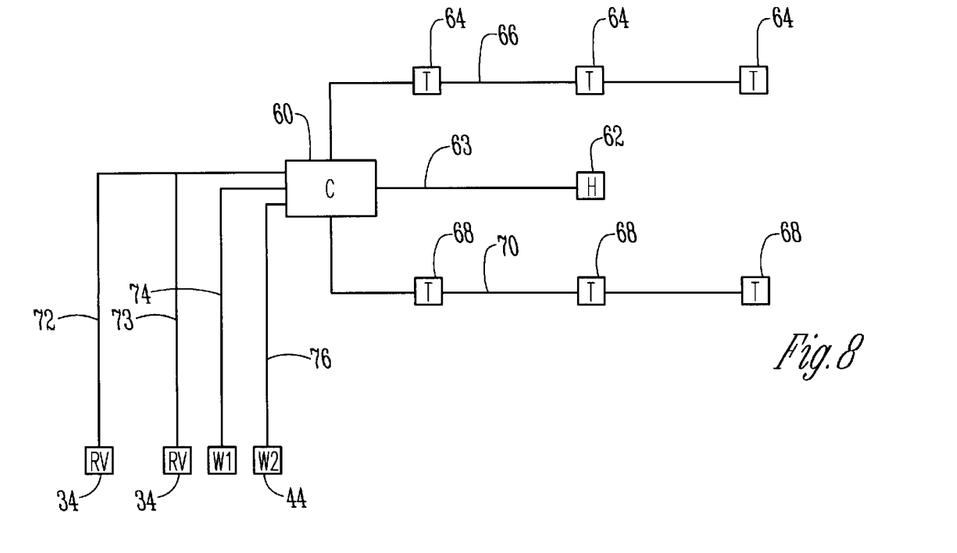
FIG. 8 is a schematic view of the control circuitry.

A controller (computer) 60 can be located in a feed room or the like (not shown) attached to building 10. As seen in FIG. 8, a humidity sensor 62 is connected to controller 60 by line 63. Sensor 62 is supported by line 63 at a level approximately 4½ feet above floor 12 and is preferably located in the center of the building (see FIG. 3). As seen in FIG. 8, the controller 60 is operatively connected to a plurality of temperature sensors 64 on the "north" side of the building by means of line 66. Similarly, a plurality of temperature sensors 68 located on the "south" side of the building are connected to controller by line 70. The temperature sensors, as shown best in FIG. 2, are normally located about 4½ feet above the level of floor 12 and are preferably located in the centers of pens 13 as best shown in FIG. 3. The sensors 64 and 68 can be suspended by lines 66 and 70, respectively, from the trusses 20. As also seen in FIG. 8, controller 60 is connected to the gear motor 34 by line 72. Similarly, the controller 60 is connected to winch motors 44 by lines 74 and 76.

It should be understood that the building 10 shown in the drawings comprises what should be regarded as a single zone having a plurality of sensors therein. If the length of building 10 is substantial, duplicate zones can be arranged in the same building and can be controlled by separate controllers 60.

In operation, the temperature sensors 64 are connected in series by line 66 and the temperature sensors 68 are connected in series by line 70. The controller through its software averages the temperatures sensed by the three sensors 64, and averages the three temperatures sensed by the sensors 68. The controller averages the readings from the group of sensors 64 and reacts to the average temperature of those three sensors. A similar phenomenon occurs in regard to the three temperature sensors 68.

The controller 60 is programmed to respond when the average temperature from sensors 64, or the average temperature from sensors 68 exceed predetermined parameters of temperature deemed suitable for the livestock or poultry housed in the building 10. Similarly, the controller 60 is programmed to respond when the humidity measured in the building by sensor 62 exceeds desired conditions of humidity within the building. In practice, in geographical locations which have winter and summer seasons, the humidity sensor 62 causes a response in controller 60 only during colder seasons when high humidity sometimes occurs within the building which causes condensation of moisture therein.

The controller 60 is programmed to increase or decrease the amount of air circulating into or out of the windows 36 or ridge vent opening 26 when the conditions of temperature and/or humidity exceed the parameters therefore stored within the controller 60. For example, when the average temperature sensed by temperature sensor 64 and 68 indicate that the temperature in the building during the summer exceeds the accepted parameters of temperature stored in the controller 60, the controller 60 will cause the curtains 38 to move towards an open condition. Similarly, the roof vent closure 28 may also be cause to move from the closed condition in FIG. 6 towards an open condition in FIG. 2. This is accomplished by the controller actuating one or more of the motors 34 or 44. Conversely, if the temperature sensors indicate that the building is too cold and below the parameters established by controller 60, the controller will reverse the operational direction of the motors 34 and 44 to cause the curtains 38 and the roof vent closure 28 to move towards their respective closed positions. The software of controller 60 will not necessarily require that the openings be totally open or totally closed, but will have the ability to move the curtains towards or away from a condition of being completely open or completely closed. Similarly, the roof vent 28 can also be moved from a position of being totally closed (FIG. 6) or totally open, (FIG. 2) or at an intermediate position. Controller 60 makes changes to the openings so that acceptable air flow patterns are maintained in building 10. This is a very unique feature of controller 60 because existing controllers blindly control these openings without any air flow pattern "checks". For example, if a situation should arise where the ridge vent closure 28 is left open, with the windows in the side walls being closed, then down drafting will occur through part of the ridge vent opening 26. That is, a portion of the ridge vent opening 26 will act like an inlet and a portion will act like an exhaust. (See the arrows shown in FIG. 5.) The problem with this arrangement is that housed livestock below the ridge vent opening 26 will be subjected to cold air moving at a high speed. The controller 60 will recognize situations like this and provide corrective measures to avoid improper air flow patterns from occurring.

Another possible improper air flow pattern occurs when the ventilation process is attempting to take place with a single side wall opening. This situation is illustrated in FIG. 6. Under that arrangement, the side wall opening will behave both as an inlet and an outlet, with an end result that many areas in the building occupied by the animals will be under-ventilated resulting in non-uniform environmental control. The controller 60 will not attempt to ventilate the building 10 with only a single opening. Provisions must always be made to ventilate the building with at least two openings. As discussed generally above, controller 60 uses the relative humidity sensor 62 to assess air quality levels in the building during cold minimum ventilation periods. It is known that minimum ventilation rates must be maintained within the building to remove moisture, dust and contaminate gases. A very good indicator of high dust and contaminate gas levels during cold winter months is the moisture level within the building. Controller 60 will provide periodic "extra" ventilation of the building if the building rises above a desired relative humidity level within the building, thereby maintaining acceptable air quality levels. Extra ventilation is accomplished by opening the ridge vent closure 28 and the side wall curtains 38 to a pre-set level for a fixed period of time to properly flush the internal air space with fresh outside air.

Natural ventilation is almost completely dependent upon outside weather influences. Controller 60 responds to outside weather influences by applying proportional vent control, a feature currently not used in livestock ventilation controllers for naturally ventilated buildings. Proportional vent control opens or closes the ridge vent closure 28 and the curtains 38 of windows 36 a distance dependent upon the difference between the current inside temperature and the desired set point temperature. If this difference is large, the openings close or open a large amount. If this difference is small, the openings close or open a small amount. Proportional vent control helps the building respond to rapidly changing weather conditions.

It is therefore seen that this invention will achieve at least its stated objectives.

What is claimed is:

1. The method of controlling ventilation and air quality within naturally ventilated livestock and poultry buildings having a generally rectangular shape with opposite side ends and walls, a roof with an elongated ridge vent, and elongated windows on the opposite side walls enclosable with flexible curtains, comprising, storing in a controller predetermined parameters of temperature and humidity within said building, providing temperature and humidity sensors within the building and connecting the same to said controller to feed to said controller actual conditions of temperature and humidity within the building, locating said temperature sensors in separate groups of individual sensors;

averaging the temperatures of the sensors in each group to provide an average temperature within each group;

comparing the average temperatures of each group with said predetermined parameters of temperature;

comparing the actual conditions of temperature and humidity within the building with said predetermined parameters of temperature and humidity stored in said controller, and increasing or decreasing the draft of air through said windows and said ridge vent to adjust the temperature and humidity within said building to fall within said predetermined parameters when said actual sensed conditions of temperature and humidity are outside said predetermined parameters.

2. The method of controlling ventilation and air quality within a naturally ventilated livestock and poultry building having an enclosed structure with a plurality of closeable air openings therein, comprising;

storing in a controller predetermined parameters of temperature within said building, providing temperature sensors within the building and connecting the same to said controller to feed to said controller actual conditions of temperature within the building, locating said temperature sensors in separate groups of individual sensors;

averaging the temperatures of the sensors in each group to provide an average temperature within each group;

comparing the average temperatures of each group with said predetermined parameters of temperature;

increasing or decreasing the draft of air capable of moving air through said openings to adjust the temperature within said building to fall within said predetermined parameters when said actual sensed conditions of temperature are outside said predetermined parameters.

3. A livestock building, comprising, an elongated livestock compartment, a plurality of closeable air openings on said structure connecting the air in said compartment to the air exterior to said compartment, a controller having stored therein predetermined parameters of temperature and humidity, sensor means in said building connected to said controller for measuring temperature and humidity within said building, said controller adapted to compare the temperature and humidity conditions within said building to said parameters of temperature and humidity for the conditions of temperature and humidity sensed within said building;

said temperature sensors being located in separate groups of individual sensors;

said controller including means to average the temperatures in each group and comparing the average temperature in each group with said parameters of temperature;

said controller being operatively connected to said openings to increase or decrease the amount of air capable of moving through said openings to bring the conditions of temperature and humidity in said building within said predetermined parameters for temperature and humidity conditions inside said building wherein existing temperature and humidity conditions in said building are outside of said parameters.

4. A livestock building, comprising, an elongated livestock compartment, a plurality of closeable air openings on said structure connecting the air in said compartment to the air exterior to said compartment, a controller having stored therein predetermined parameters of temperature, sensor means in said building connected to said controller for measuring temperature within said building, said controller adapted to compare the temperature conditions within said building to said parameters of temperature for the conditions of temperature sensed within said building;

said temperature sensors being located in separate groups of individual sensors;

said controller including means to average the temperatures in each group and comparing the average temperature in each group with said parameters of temperature;

said controller being operatively connected to said openings to increase or decrease the amount of air capable of moving through said openings to bring the conditions of temperature in said building within said predetermined parameters for temperature conditions inside said building wherein existing temperature in said building are outside of said parameters.

* * * * *

UNITED STATES PATENT AND TRADEMARK OFFICE
CERTIFICATE OF CORRECTION

PATENT NO. : 5,813,599
DATED : September 29, 1998
INVENTOR(S) : Steven J. Hoff

It is certified that error appears in the above-identified patent and that said Letters Patent is hereby corrected as shown below:

Column 1, line 7, insert the following paragraph:

— The invention was made with government support under the United States Department of Agriculture using Hatch funds; IAHEES project number IA 3140. The United States government has certain rights in this invention. —

Signed and Sealed this

Second Day of March, 1999

Attest:

Q. TODD DICKINSON

Attesting Officer

Acting Commissioner of Patents and Trademarks